No. 618,661. Patented Jan. 31, 1899.
T. GRIFFITHS.
PIPE CONNECTION FOR RAILWAY CARS.
(Application filed Mar. 22, 1898.)
(No Model.) 4 Sheets—Sheet 1.
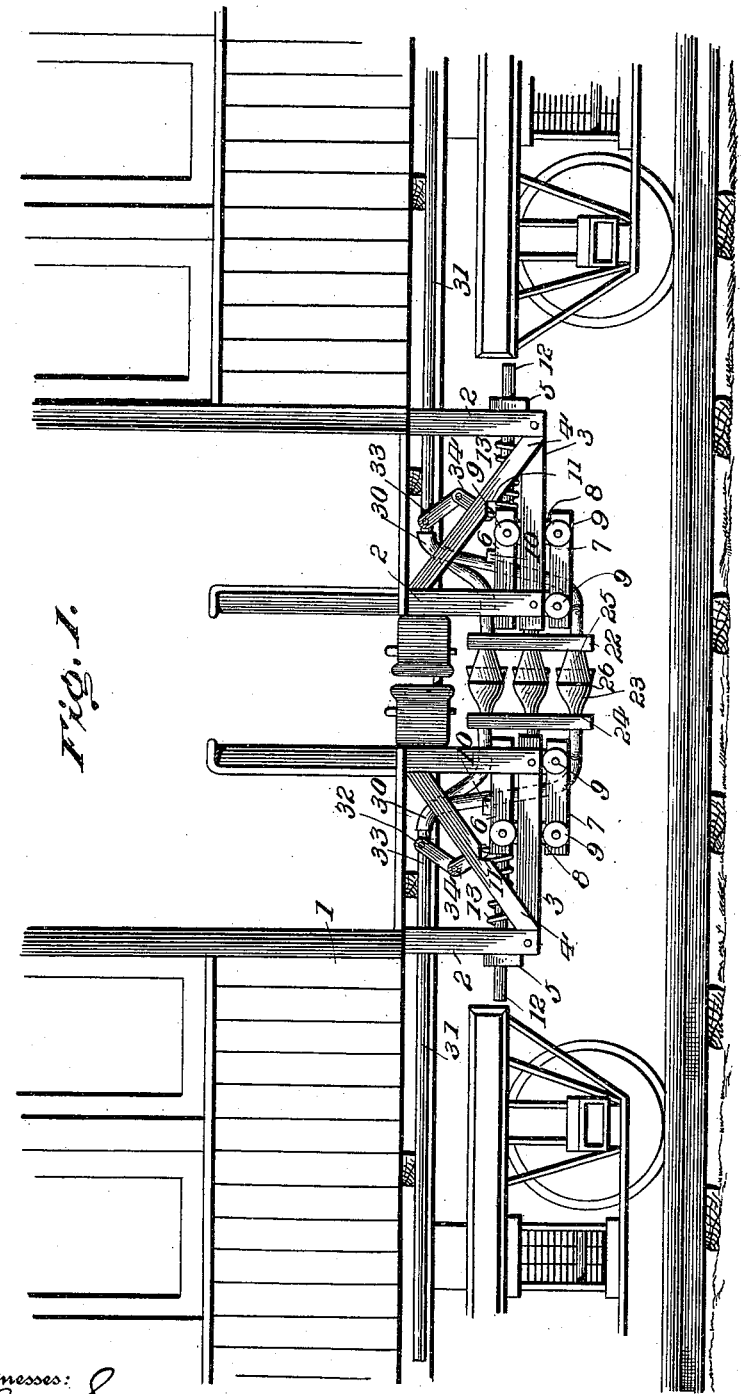

No. 618,661. Patented Jan. 31, 1899.
T. GRIFFITHS.
PIPE CONNECTION FOR RAILWAY CARS.
(Application filed Mar. 22, 1898.)
(No Model.) 4 Sheets—Sheet 2.
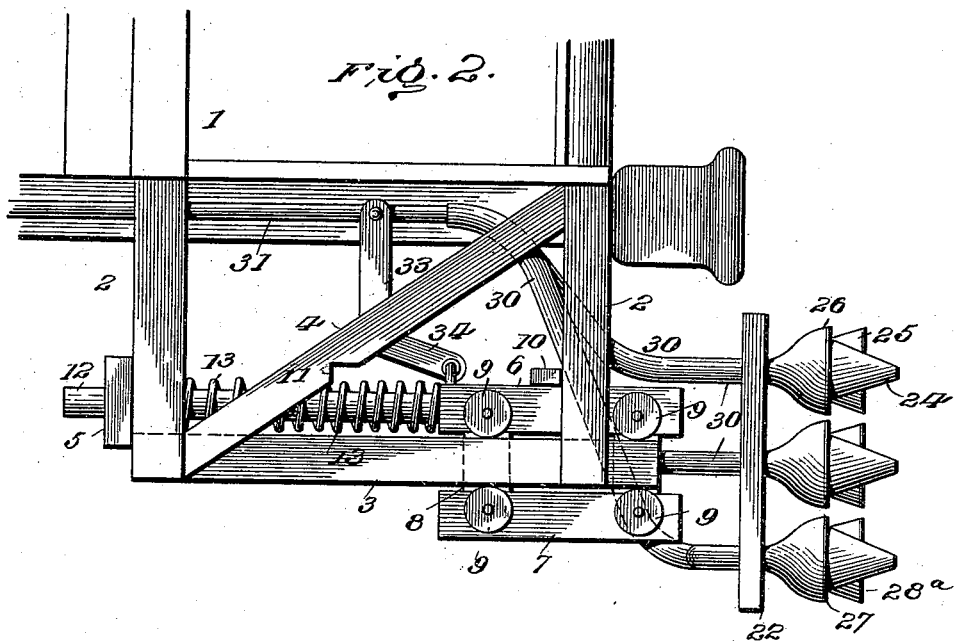
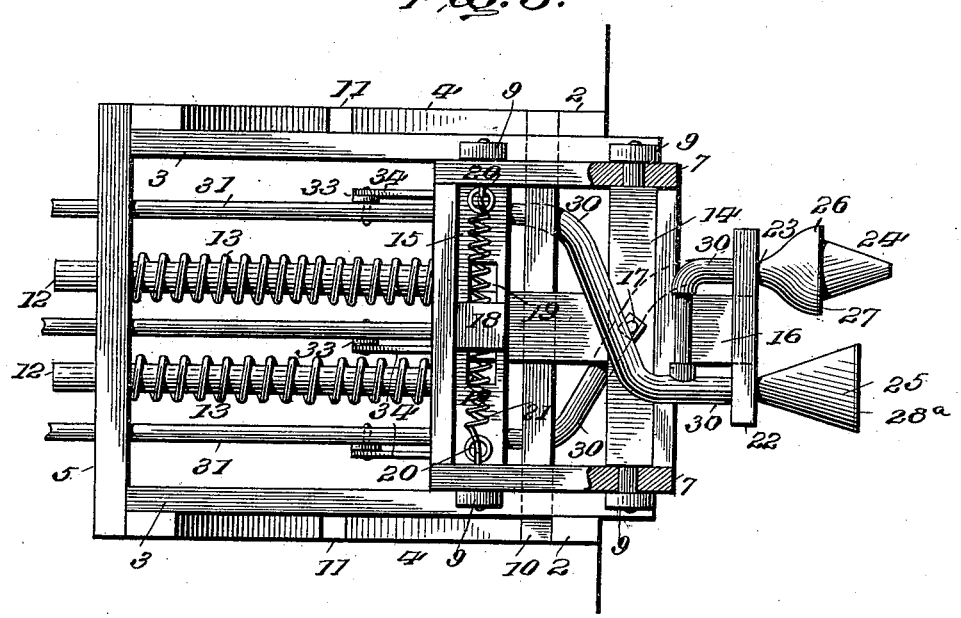
Witnesses:
Inventor
Thomas Griffiths
by R. S. & A. B. Lacey
Attorneys No. 618,661. Patented Jan. 31, 1899.
T. GRIFFITHS.
PIPE CONNECTION FOR RAILWAY CARS.
(Application filed Mar. 22, 1898.)
(No Model.) 4 Sheets—Sheet 3.
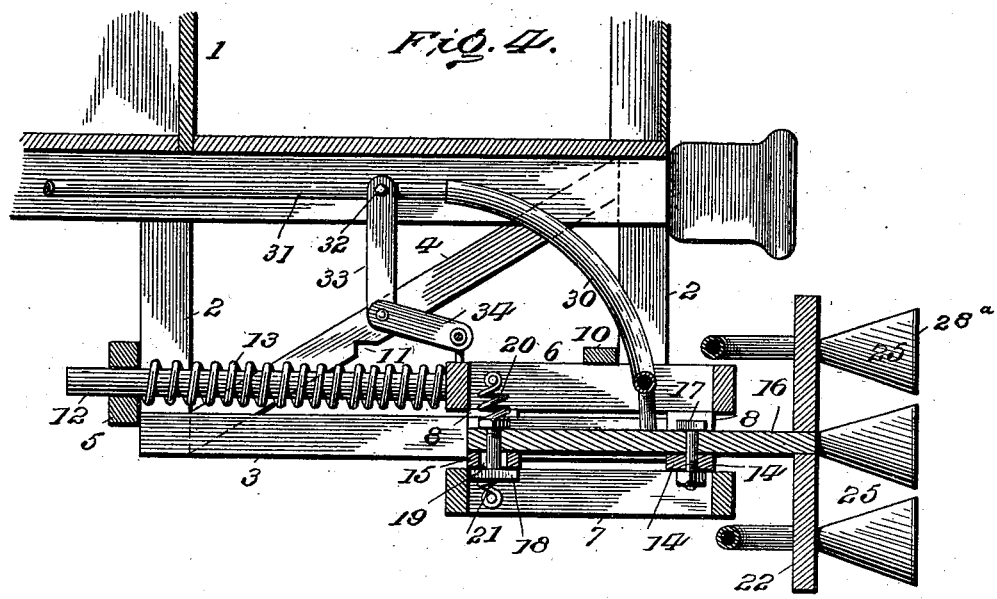
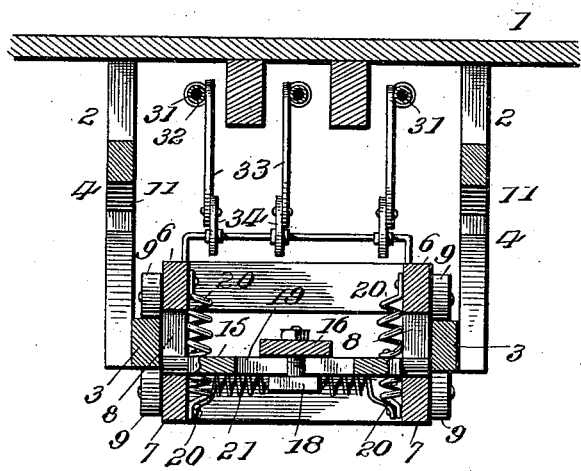
Witnesses:
Inventor
Thomas Griffiths
by R. S. & A. B. Lacey,
Attorneys.

No. 618,661. Patented Jan. 31, 1899.
T. GRIFFITHS.
PIPE CONNECTION FOR RAILWAY CARS.
(Application filed Mar. 22, 1898.)
(No Model.) 4 Sheets—Sheet 4.
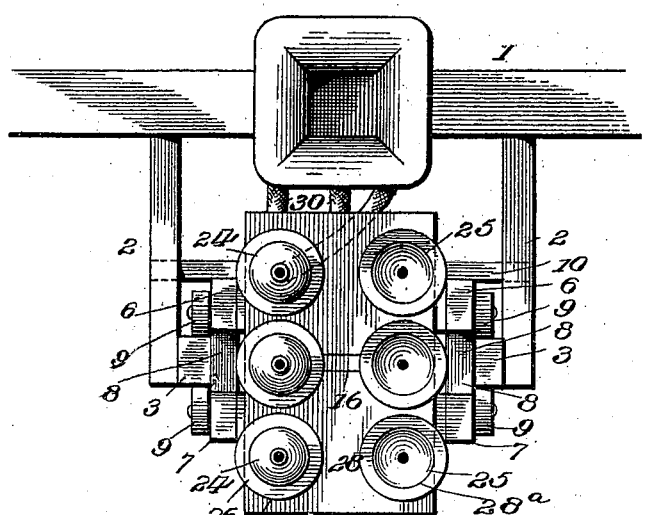
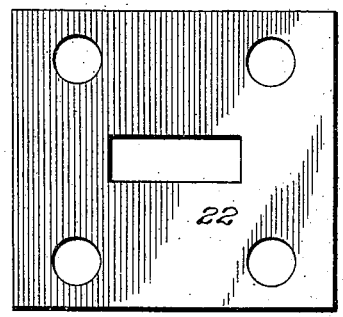
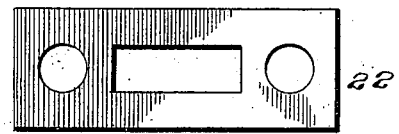
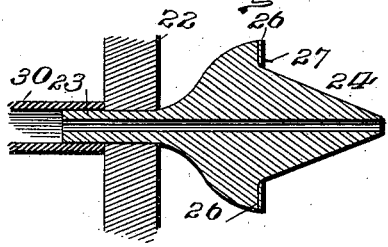
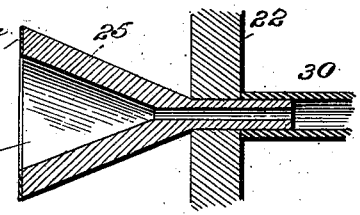
Inventor
Thomas Griffiths
by R.S.A. & P. Lacey,
Attorneys.
Witnesses:

UNITED STATES PATENT OFFICE.

THOMAS GRIFFITHS, OF FISHKILL, NEW YORK, ASSIGNOR OF ONE-HALF TO WILLIAM TUTHILL HAWKINS, OF SAME PLACE.

PIPE CONNECTION FOR RAILWAY-CARS.

SPECIFICATION forming part of Letters Patent No. 618,661, dated January 31, 1899.

Application filed March 22, 1898. Serial No. 674,830. (No model.)

*To all whom it may concern:*

Be it known that I, THOMAS GRIFFITHS, a citizen of the United States, residing at Fishkill, in the county of Duchess and State of New York, have invented certain new and useful Improvements in Pipe Connections for Railway-Cars; and I do hereby declare the following to be a full, clear, and exact description of the invention, such as will enable others skilled in the art to which it appertains to make and use the same.

This invention relates to automatically-operating pipe connections for railway-cars intended for application to and use on either passenger or freight service.

The invention consists of the construction and arrangement of parts hereinafter more fully described and claimed.

The primary object of the invention is to centralize the heads or connectors for a number of pipes at opposite ends of a car and effect an automatic coupling of the said heads or connectors on distinct cars simultaneously with the articulation of the ordinary car-couplings and at the same time open valves in the several pipes and cause a direct communication to be set up between adjacent cars, and, further, when the cars are either purposely or accidentally disconnected to insure an automatic cut-off of the pipes and avoid waste or useless expenditure of the brake motive agent, heating medium, or other fluid.

Many other objects and advantages will appear in the subjoined description, and to attain the purpose in view the accompanying drawings illustrate the preferred arrangement, and therein—

Figure 1 represents the ends of two cars coupled together and embodying the invention. Fig. 2 is a side elevation, on a larger scale, of one member of the improved connector. Fig. 3 is a bottom plan view of the device shown by Fig. 2. Fig. 4 is a central vertical section. Fig. 5 is a transverse section taken slightly in rear of the front uprights. Fig. 6 is a front elevation of one of the coupling heads or supports, showing the adjacent arrangement of male and female connections for engagement of correlative parts. Fig. 7 is a detail view of a support or plate for the heads or connectors on passenger-cars employing stoves as the heating medium. Fig. 8 is a detail view of another support or plate for use on freight-cars. Figs. 9 and 10 are longitudinal sectional views of opposite male and female heads, respectively.

Referring to the drawings, wherein similar numerals of reference are employed to indicate corresponding parts in the several views, the numeral 1 designates a car bed or body from which depends forward and rear hangers 2, connected at or adjacent their lower ends by longitudinally-disposed guides or tracks 3, and also have attached thereto intermediate diagonal braces 4. The hangers 2 are rigidly fixed to the under side of the car-bed or frame-bed, and are further reinforced by a rear transverse strip 5, which serves also as a support or bearing, as will be hereinafter particularly referred to.

A carriage is movably mounted on the guides or tracks 3, and comprises upper and lower rectangular frames 6 and 7, spaced apart and connected together near their corners by vertical ties 8. Rollers or track-wheels 9 are carried by the outer portions of said frames, and a free antifrictional travel of said carriage is thereby established either in a forward or backward direction. On top of the carriage a transverse stop-bar 10 is secured and is adapted to strike against the outer pair of hangers 2 or be received in angular stop-notches 11 in the front edges of the diagonal braces 4, and the said carriage is thus limited in its outward and rearward movements.

Extending rearward from the upper frame of the carriage are a pair of parallel guide-rods 12, which are freely movable in the transverse stip 5, and surrounding said rods between the upper frame and said strip are coil-springs 13, operating to normally impel the carriage outwardly a predetermined distance.

A horizontal pivot-bar 14 is connected at its opposite ends to the front ties 8, and in the rear ties the opposite reduced ends of a slidable guide-bar 15 is mounted. A longitudinal shank 16 is pivoted at 17 to pivot-bar 14, and at the rear has a flat-headed bolt 18, extending downwardly therefrom and freely movable in a slot 19 in the guide-bar 15. By the specified arrangement of the pivot-bar, guide-bar, and shank the latter is capable of having a lateral movement in opposite directions on the pivot 17 and a vertical reciprocation by the pivotal action of said pivot-bar and the vertical sliding attachment of the guide-bar and an automatic compensatory adjustment relative to the swaying or undulation of the car to which the attachment is applied is provided. To restore the shank and the parts intimately connected thereto to normal condition, spiral springs 20 are attached to the guide-bar 15 and to upper and lower portions or frames of the carriage, and similar springs 21 connect the opposite portions of the rear end of the shank to adjacent parts of the said carriage to thereby bring said shank to a central position.

On the forward or outer end of the shank, at a suitable distance from the extreme forward position of the carriage, is secured a vertical plate 22, preferably rectangular in contour, through which extend hollow stems 23 of conical connectors or heads 24, arranged in vertical alinement on one side, and of sockets 25, likewise positioned on the opposite side. The number of heads and sockets will vary in accordance with the character or kind of car by which the attachment or improvement is carried, or whether a pneumatic or other signal is used or steam or stove heat utilized. Where the brake motive agent, signal-actuating medium, and heating fluid or gas are conducted in pipes and form a part of the equipment of a car, the number of heads and sockets will be as indicated by Figs. 1, 2, 3, and 4, and the complementary heads and sockets on separate cars will be reversely located—that is, one set of heads will be in line with an opposite set of sockets. Each of the said conical heads has a central aperture running longitudinally therethrough in line with the stem thereof and an annular flange 26, having fitted thereagainst a rubber gasket or packing 27, and the sockets 25, having conical mouths 28 leading to the openings in the stems projecting therefrom, and also provided with outer-edge gaskets or packing-rings 28$^a$ to fit closely against and form a tight joint with the gaskets or packings 27 when the male and female parts of the connector, consisting of the heads and sockets, are engaged or fitted to each other.

The stem of each of the heads is connected to the stem of each of the sockets in a horizontal plane therewith by a yielding or flexible tube 30, and each set, comprising one head and one socket, are similarly attached to a train-pipe 31, so that each of the three train-pipes, when the latter number is employed, is represented on the plate 22 and designed to be attached to a similar arrangement on an opposite car.

When only one or two train-pipes are included in the equipment of a car, the plates shown by Figs. 8 and 7, respectively, would be used with one or two sets of heads and sockets thereon. Where three sets of the heads and sockets are used, it will indicate that a brake motive agent, signal-operating medium, and a heating fluid or other material is conveyed from car to car from the prime generative source in the engine. One set of heads and sockets would imply that a brake motive agent only is conveyed from one car to another, as on the ordinary freight-cars. The use of two sets of heads and sockets in the present instance is intended to be understood to illustrate the improved device as applicable to cars having brake and signal motive agents or mediums, but no transmitted heating fluid or gas.

In each of the train-pipes a valve 32 is located, and connected thereto are valve-operating plates or bars 33, having links 34 pivoted to their lower ends and also movably attached to the rear portion of the upper frame 6 of the carriage. Thus when the carriage is moved rearward the links swing the valve-operating plates or bars to open the valves, and on the reverse movement of said carriage the valves are closed. The number of valves utilized will be regulated by the train-pipe equipment, and consequently connecting parts will be increased or decreased accordingly.

From the foregoing description it will be seen that as two cars having the improvement come together the opposite heads and sockets are caused to articulate and the opposite carriages move rearward and open the valves in the pipes, thereby establishing a continuous communication through all the pipes of the several cars that are coupled. Normally the plates 22 stand outward beyond the ordinary car-coupling heads, and when the latter are joined the said plates are necessarily pressed back against the action of the repellent springs surrounding the guide-rods 12 of the carriages. The said position of parts, together with the gaskets on the heads and sockets, forms an air, steam, or gas tight joint between said heads and sockets. When two cars that have been connected are purposely or accidentally disconnected, the carriages are forced outwardly to their extreme limit and the valves in the train-pipes are fully closed. This automatic closing of the valves is exceptionally beneficial when a train accidentally breaks at an intermediate point, as the engineer in the propelling-locomotive will still have control of his brakes, and also if a series of pipes are used, the transmitted material in the pipes, aside from the brake service-pipe, will not be uselessly expended.

The parts of the attachment will remain connected so long as the car-couplers are intact, and movements of the car will not affect the jointure of the heads and sockets owing to the pivotal arrangement heretofore set forth.

It will be understood that the cones and sockets on the opposite ends of a car will be similar in number that there may be no possibility of a mistake in bringing unlike connections together and defeat the purpose of the improvement, which might occur where one form of the device was used on one end of a car and another form on the opposite end.

It is unnecessary to extraneously or otherwise manipulate or adjust the heads and sockets when two cars come together, as such parts are so gaged relatively to the car-couplings that an engagement of the latter will cause an accurate connection of the former. This dispenses with the customary practice of having an operator or train-maker pass between car ends to arrange the train or service pipe connections.

The form of the device set forth is preferred; but it is subject to changes in the proportions, dimensions, and minor details which could be made and substituted for or replace those shown and described and still remain within the scope of the invention.

Having thus fully described my invention, what I claim as new and useful, and desire to secure by Letters Patent, is—

1. In a device of the character set forth, a reciprocable carriage, a shank freely supported by said carriage, a plate on the outer end of said shank and carrying opposite connecting heads and sockets, train-pipes attached to said heads and sockets and having valves therein, means attached to said carriage for operating the valves, a transverse stop-bar on top of the carriage, and braces having notches therein to receive a portion of the stop-bar and limit the rearward movement of the valves.

2. In a device of the character set forth, a reciprocable carriage, a shank freely supported by said carriage, a plate on the outer end of said shank and carrying opposite connecting heads and sockets, depending hangers connected by longitudinally-disposed guides or tracks for the carriage, a transverse stop-bar on top of the carriage, and braces between the front and rear hangers against which the said stop-bar is adapted to strike, the carriage being limited in its outward movement by the front hangers.

3. In a device of the character set forth, a reciprocable carriage consisting of two horizontal frames connected by corner-ties, a pivot-bar having its opposite ends movably bearing in the front ties, a guide-bar vertically movable in the rear ties and having a slot therein, a shank pivoted to said pivot-bar and having a bolt movable in the slot of the guide-bar, means for restoring the several parts to their normal position, and connecting devices supported by the shank.

4. In a device of the character set forth, the combination of a reciprocable carriage, a shank freely supported by said carriage, a plate on the outer end of said shank normally held in advance of the ordinary car-coupler, connecting devices on the said plate consisting of opposite lines of heads and sockets, train-pipes having valves therein, means attached to said carriage for operating the valves, and tubular transmitting devices between the train-pipes and connecting devices.

In testimony whereof I affix my signature in presence of two witnesses.

THOMAS GRIFFITHS.

Witnesses:
WILLIAM T. HAWKINS,
THOMAS J. CUNNINGHAM.